("12") United States Patent
Zheng et al.

(10) Patent No.: US 10,923,875 B2
(45) Date of Patent: Feb. 16, 2021

(54) INTEGRATED COMPONENT FOR AN OPTICAL AMPLIFIER

(71) Applicant: Lumentum Operations LLC, Milpitas, CA (US)

(72) Inventors: Jiamin Zheng, Ottawa (CA); Barrie P. Keyworth, Ottawa (CA); Paul Colbourne, Ottawa (CA); Dhanorm Plumwongrot, Klongluang (TH); Gareth Jones, Klongluang (TH); Sheldon McLaughlin, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 292 days.

(21) Appl. No.: 15/889,736

(22) Filed: Feb. 6, 2018

(65) Prior Publication Data
US 2019/0245316 A1    Aug. 8, 2019

(51) Int. Cl.
*G02B 26/08* (2006.01)
*G02B 26/10* (2006.01)
(Continued)

(52) U.S. Cl.
CPC ...... *H01S 3/06766* (2013.01); *G02B 26/0833* (2013.01); *G02B 27/0955* (2013.01);
(Continued)

(58) Field of Classification Search
CPC .............. G02B 26/0858; G02B 26/105; G02B 26/101; G02B 26/0833; G02B 26/085; B81B 2201/042; H04N 9/3135; H04N 9/3173; H04N 9/3161; H04N 9/3129; H04N 9/3164; G01S 7/4817; G01S 17/42; G01S 17/10; G01S 17/89; H04B 10/11; H04B 10/1121
(Continued)

(56) References Cited

U.S. PATENT DOCUMENTS 5,285,310 A * 2/1994 Miller ..................... H01S 3/235
                                                                    359/338
5,956,355 A * 9/1999 Swanson ............ A61B 1/00183
                                                                    356/479
(Continued)

OTHER PUBLICATIONS

Korevaar et al., Status of BMDO/IST Lasercom Advanced Technology Demonstration, (1994), Proceedings of SPIE, Los Angeles, CA, United States, Proc. SPIE 2123, Free-Space Laser Communication Technologies VI, (Aug. 16, 1994); https://doi.org/10.1117/12.184640 (Year: 1994).*

(Continued)

*Primary Examiner* — William R Alexander
*Assistant Examiner* — Tamara Y. Washington
(74) *Attorney, Agent, or Firm* — Harrity & Harrity, LLP

(57) ABSTRACT

An optical device may include a package having a first port for receiving signal light, a source for providing pump light, a combiner for combining the signal light and the pump light into combined light, a second port for sending the combined light, a third port for receiving amplified light, and a free-space optical system for filtering amplified signal light from the amplified light, and a fourth port for sending the amplified signal light. The free-space optical system may include beam shaping optics that enlarge a beam size of the amplified light prior to the filtering.

20 Claims, 12 Drawing Sheets

(51) Int. Cl.
| | |
|---|---|
| *G02B 26/12* | (2006.01) |
| *H01S 3/067* | (2006.01) |
| *H01S 3/00* | (2006.01) |
| *H01S 3/23* | (2006.01) |
| *H01S 3/081* | (2006.01) |
| *H01S 3/10* | (2006.01) |
| *G02B 27/09* | (2006.01) |
| *H01S 3/13* | (2006.01) |
| *H01S 3/02* | (2006.01) |
| *H01S 3/16* | (2006.01) |
| *H01S 3/094* | (2006.01) |
| *H01S 3/063* | (2006.01) |
| *H01S 3/0941* | (2006.01) |

(52) U.S. Cl.
CPC ............ *H01S 3/0078* (2013.01); *H01S 3/025* (2013.01); *H01S 3/06704* (2013.01); *H01S 3/06754* (2013.01); *H01S 3/0811* (2013.01); *H01S 3/1003* (2013.01); *H01S 3/10023* (2013.01); *H01S 3/1302* (2013.01); *H01S 3/1305* (2013.01); *H01S 3/2308* (2013.01); *H01S 3/0632* (2013.01); *H01S 3/09415* (2013.01); *H01S 3/094003* (2013.01); *H01S 3/1608* (2013.01)

(58) Field of Classification Search
USPC ............ 398/37, 60, 67, 79; 385/37, 24; 359/333–349; 372/50, 22; 370/212, 310
See application file for complete search history.

(56) References Cited

U.S. PATENT DOCUMENTS

| | | | | |
|---|---|---|---|---|
| 6,192,058 | B1* | 2/2001 | Abeles | G02B 6/4248 359/337.11 |
| 6,236,497 | B1 | 5/2001 | Andersen et al. | |
| 6,351,325 | B1* | 2/2002 | Mandella | G02B 21/0056 359/210.1 |
| 6,423,956 | B1* | 7/2002 | Mandella | G02B 1/105 250/201.3 |
| 6,525,863 | B1* | 2/2003 | Riza | G02B 6/266 359/238 |
| 6,760,160 | B2* | 7/2004 | Zhang | G02B 6/2746 359/341.1 |
| 7,187,871 | B1* | 3/2007 | Kaushik | H04B 10/505 398/182 |
| 7,295,365 | B2 | 11/2007 | Sommer et al. | |
| 9,806,486 | B2 | 10/2017 | Garrett et al. | |
| 10,003,168 | B1* | 6/2018 | Villeneuve | G01S 7/484 |
| 10,429,187 | B1* | 10/2019 | Sanders | G01C 19/64 |
| 10,580,545 | B2* | 3/2020 | Banine | G02B 27/1086 |
| 2002/0154661 | A1* | 10/2002 | Hoose | H01S 3/2383 372/6 |
| 2002/0154855 | A1* | 10/2002 | Rose | G02B 6/29311 385/24 |
| 2002/0195496 | A1* | 12/2002 | Tsikos | B82Y 15/00 235/462.01 |
| 2003/0067645 | A1* | 4/2003 | Ibsen | G01J 3/02 398/79 |
| 2003/0146282 | A1* | 8/2003 | Tsikos | B82Y 15/00 235/454 |
| 2004/0264977 | A1* | 12/2004 | Yap | G02F 2/02 398/161 |
| 2007/0196107 | A1* | 8/2007 | Takita | G02B 6/359 398/45 |
| 2008/0205887 | A1* | 8/2008 | Murano | G02B 6/4214 398/48 |
| 2009/0046747 | A1* | 2/2009 | Maestle | G01M 11/335 372/20 |
| 2009/0238218 | A1* | 9/2009 | Yao | H01S 3/1308 372/20 |
| 2010/0007852 | A1* | 1/2010 | Bietry | G03B 21/28 353/8 |
| 2011/0087879 | A1* | 4/2011 | Chand | H04K 3/25 713/153 |
| 2011/0122912 | A1* | 5/2011 | Benjamin | H01S 5/4006 372/50.124 |
| 2011/0142084 | A1* | 6/2011 | Reid | H01S 3/10015 372/20 |
| 2012/0105945 | A1* | 5/2012 | Erlandson | G02B 27/0966 359/337.2 |
| 2014/0177237 | A1* | 6/2014 | Welford | A61B 5/0066 362/341 |
| 2015/0236475 | A1* | 8/2015 | Kasper | H01S 3/06754 359/341.3 |
| 2016/0231640 | A1* | 8/2016 | Inoue | G02F 1/395 |
| 2018/0266854 | A1* | 9/2018 | Moore | G01B 11/161 |
| 2018/0351684 | A1* | 12/2018 | Osenbach | H04J 14/021 |
| 2018/0356210 | A1* | 12/2018 | Moore | G01B 11/161 |
| 2019/0072599 | A1* | 3/2019 | Schubert | G01R 29/0885 |
| 2019/0072600 | A1* | 3/2019 | Schubert | A61B 5/04001 |
| 2019/0245316 | A1* | 8/2019 | Zheng | H01S 3/0811 |
| 2019/0250336 | A1* | 8/2019 | Guo | G02B 6/29361 |
| 2019/0346295 | A1* | 11/2019 | Moore | G01D 18/00 |
| 2020/0003619 | A1* | 1/2020 | Hu | G01J 3/4406 |

OTHER PUBLICATIONS

Kwong, et al., Coherent-Detection of Narrow-Unewidth Millimeter-wave and Microwave Subcarrier Signals for Future Mobile/Personal Communications, (1994), Proceedings of the Military communications conference. Long Branch, NJ, 3:940-944 (Year: 1994).*

Berger et al., Tunable MEMS Devices for Reconfigurable Optical Networks, Mar. 6, 2005, Optical Fiber Communication Conference and Exposition and The National Fiber Optic Engineers Conference 2005, paper OThD1 (Year: 2005).*

* cited by examiner

INTEGRATED COMPONENT FOR AN OPTICAL AMPLIFIER

TECHNICAL FIELD

The present disclosure relates to an optical amplifier and, more particularly, to a compact optical amplifier assembled on a planar optical package.

BACKGROUND

An optical amplifier is a device that is to receive signal light and generate amplified signal light (i.e., signal light with comparatively higher optical power). Typically, the optical amplifier provides optical amplification using a so-called gain medium, which is "pumped" (i.e., provided with energy) by a source, such as a pump laser. In some cases, the optical amplifier may utilize an optical fiber as a gain medium (such a device may be referred to as a fiber amplifier). In such a case, the gain medium may be a glass fiber doped with rare earth ions, such as erbium, neodymium, ytterbium, praseodymium, thulium, and/or the like. Such a fiber may be referred to as an active fiber. In operation, the signal light propagates through the active fiber together with pump light, and the active fiber outputs the amplified signal light that is generated from the signal light and the pump light. Generally, such optical amplifiers include other discrete components associated with controlling, enabling, and/or monitoring optical amplification. Such discrete components may include, for example, one or more isolators, a combiner (e.g., a wavelength division multiplexer (WDM)), a tunable filter, a tap, a photo diode, and/or the like.

SUMMARY

According to some possible implementations, an optical device, may include a package having: a first port for receiving signal light; a source for providing pump light; a combiner for combining the signal light and the pump light into combined light; a second port for sending the combined light; a third port for receiving amplified light; a free-space optical system for filtering amplified signal light from the amplified light, wherein the free-space optical system includes beam shaping optics that enlarge a beam size of the amplified light prior to the filtering; and a fourth port for sending the amplified signal light.

According to some possible implementations, an optical package may include: a plurality of ports including a first port for receiving signal light, a second port for sending combined light, a third port for receiving amplified light, and a fourth port for sending amplified signal light; a source for providing pump light; a combiner for combining the signal light and the pump light into the combined light; and free-space optics for filtering the amplified signal light from the amplified light, wherein the free-space optics include beam shaping optics for resizing the amplified light.

According to some possible implementations, a method may include: receiving signal light by a first port of an optical device; providing pump light by a source of the optical device; combining, by a combiner of the optical device, the signal light and the pump light into combined light; sending the combined light by a second port of the optical device; receiving amplified light by a third port of the optical device; resizing, by beam shaping optics of the optical device, a beam size of the amplified light, wherein the beam shaping optics are included in a free-space optical system of the optical device; filtering, by the free-space optical system of the optical device and after the resizing, amplified signal light from the amplified light; and sending the amplified signal light by a fourth port of the optical device.

DETAILED DESCRIPTION

The following detailed description of example implementations refers to the accompanying drawings. The same reference numbers in different drawings may identify the same or similar components. The implementations described below are merely examples and are not intended to limit the implementations to the precise forms disclosed. Instead, the implementations were selected for description to enable one of ordinary skill in the art to practice the implementations.

Figure 1A:
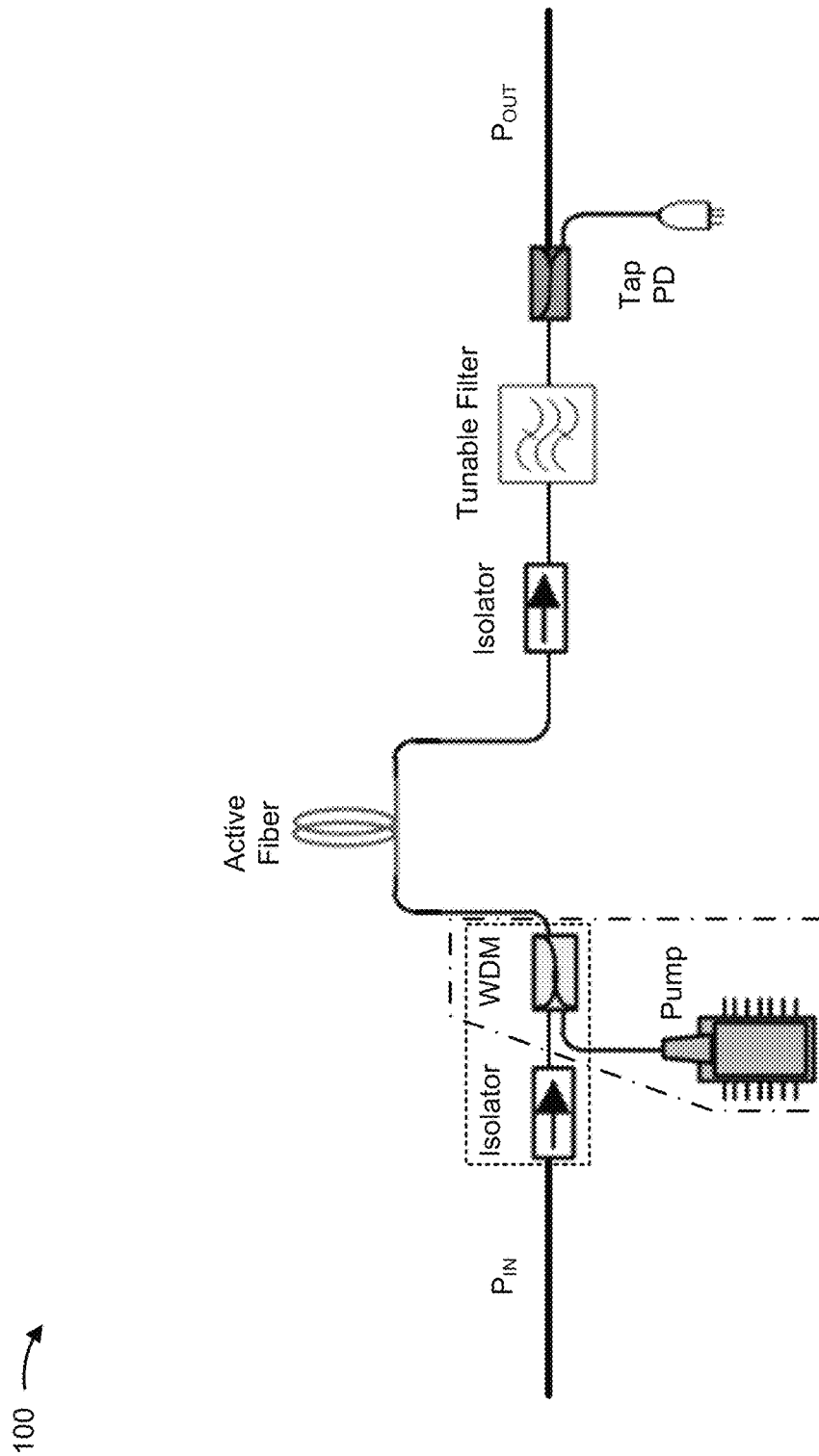
FIG. 1A is a diagram of a prior art optical amplifier.

A typical optical amplifier, such as an erbium doped fiber amplifier (EDFA), is constructed from several discrete components, such as a pump laser, one or more isolators, a WDM, an active fiber (sometimes referred to as a doped fiber), a tunable filter, a tap, a photo diode, and/or the like. FIG. 1A is a diagram of a prior art optical amplifier 100 including discrete components for a pump laser, a pair of isolators (e.g., an isolator before the active fiber and an isolator after the active fiber), a WDM, a tunable filter, a tap, and a photo diode.

As shown in FIG. 1A, the discrete components of the typical optical amplifier (e.g., prior art optical amplifier 100) are interconnected by splicing optical fibers between the discrete components. However, these discrete components, the optical fibers coupled to these discrete components, and/or the fiber splices may require a significant amount of physical space (i.e., the optical amplifier may be undesirably large in overall size) and/or may introduce a significant amount of loss to the optical amplifier system. Furthermore, due to the need for managing optical fibers and splicing the optical fibers between the discrete components, manufacture of such an optical amplifier may be time consuming, costly, and/or may not be amenable to automation.

In some cases, multiple functions, that would typically be provided by separate discrete components, can be integrated into a single so-called "hybrid" component (e.g., a single component that performs the multiple functions). For example, as indicated by the dashed and dotted shape in FIG. 1A, the pump laser and the WDM may be integrated to form a single hybrid component, in some cases. As another example, as shown by the dotted rectangle in FIG. 1A, an isolator and the WDM may be integrated to form a single hybrid component, in some cases. Although not shown in FIG. 1A, in practice, a hybrid component includes two or more discrete components that are physically attached to one another (without an optical fiber between). While the use of such hybrid components, together with achievable size reductions of pump lasers, use of high concentration active fibers, and other such improvements, may reduce the overall size of the optical amplifier (e.g., from dimensions of hundreds of millimeters to dimensions of tens of millimeters) and/or may reduce loss of the optical amplifier (e.g., by requiring fewer fiber splices), a number of issues arise due to the use of hybrid components.

One issue is that, while a number of optical fibers and/or fiber splices may be reduced when using one or more hybrid components (e.g., as compared to an optical amplifier that includes only discrete components), some hybrid components (and discrete components) may still need to be interconnected using optical fibers. Thus, use of hybrid components may not fully resolve the manufacturability issues described above.

Another issue is that the use of hybrid components introduces optical alignment issues in an optical amplifier (e.g., when free space optics-to-fiber coupling and/or fiber-to-free space optics coupling is needed). For example, a discrete component can typically be manipulated with respect to six degrees of freedom in association with aligning components of the optical amplifier, and a given discrete component may be manipulated to account for misalignment of another discrete component. However, since a given hybrid component includes two or more physically connected discrete components, one or more degrees of freedom are lost (e.g., since each component cannot be individually aligned). Further, misalignments from each component of a given hybrid component may be stacked (e.g., such that misalignment of one component of the hybrid component is compounded by misalignment of another component of the hybrid component), which may result in misalignment that is not easily correctable by another component of the optical amplifier. As such, in a prior art optical amplifier that uses one or more hybrid components, optical alignment may be more difficult and/or impossible due to the use of hybrid components, thereby resulting in increased loss and/or reducing manufacturability.

As the trend requiring size reduction continues (with improved performance or at least maintaining performance), further size and loss reductions in optical amplifiers are needed. However, the needed size and/or loss reductions are note achievable with the prior art optical amplifiers described above (e.g., prior art optical amplifier 100, a prior art optical amplifier that uses hybrid components, and/or the like). For example, in order to allow an optical amplifier to fit inside a standalone pluggable optical amplifier module (e.g., a standalone pluggable EDFA) or to allow the optical amplifier to be integrated in a pluggable module including a transmitter and/or a receiver (e.g., a pluggable transceiver), dimensions of the optical amplifier may need to be further reduced (e.g., to less than approximately 10 millimeters), particularly in thickness (i.e., thick). Generally, the prior art optical amplifiers described above share a cylindrical platform (with fiber pigtails at both ends). Thus, thickness reduction of the optical amplifier is limited (e.g., since the cross-section of the cylindrical platform is rotational symmetric). Furthermore, as described above, even when some size reduction is possible through the use of hybrid components, the size reduction may be come at the cost of increased loss and/or reduced manufacturability of the device.

Some implementations described herein provide a compact optical amplifier that uses components assembled on a planar optical package, such as an optical bench. As described below, the compact optical amplifier has a reduced size in terms of height, length, and/or width (e.g., as compared to the prior art optical amplifiers described above). Additionally, the compact optical amplifier reduces loss by requiring fewer instances of free space optics-to-fiber coupling and/or fiber-to-free space optics coupling for light propagating through the optical amplifier system (e.g., as compared to the prior art optical amplifiers described above). Furthermore, the compact optical amplifier provides the capability to include further features that previous hybrid components could not provide, as described below.

Figure 1B:
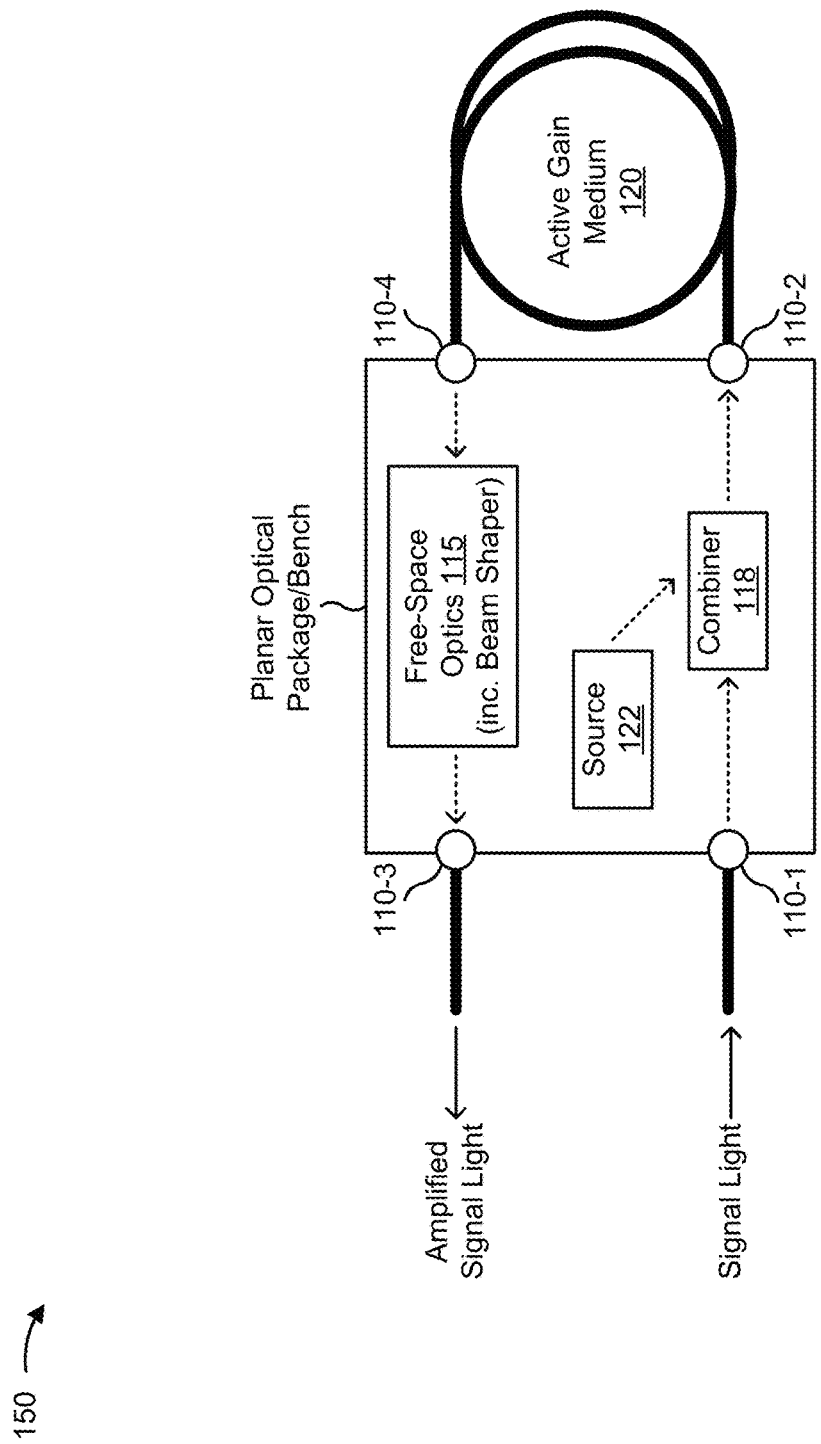
FIG. 1B is a diagram of an overview of an example compact optical amplifier described herein.

FIG. 1B is a diagram of an overview of an example compact optical amplifier 150. As shown in FIG. 1B, compact amplifier 150 may include a set of ports 110 (e.g., port 110-1 through port 110-4), free-space optics 115 that includes beam shaping optics (sometimes referred to herein as a beam shaper), a combiner 118, an active gain medium 120, and a source 122.

As shown in FIG. 1B, port 110-1 may be a port for receiving signal light and sending the signal light to combiner 118 for combining with pump light, provided by source 122, into combined light. As further shown, port 110-2 may be a port for sending the combined light to active gain medium 120 for generation of amplified light from the combined light. As further shown, port 110-3 may include a port for receiving the amplified light from active gain medium 120, and providing the amplified light to free-space optics 115 for filtering amplified signal light from the amplified light. In some implementations, the beam shaper, included in free-space optics 115, may include a set of components (e.g., one or more lenses, prisms, and/or the like) that enlarge a beam size of the amplified light prior to the filtering (e.g., in order to improve resolution with a filter included in free-space optics 115, in order to satisfy a performance requirement of one or more components of free-space optics 115, and/or the like). In some implementations, after the filtering, the beam shaper may reduce the beam size the amplified signal light (e.g., in order to return the beam size to the previous beam size). As further shown, port 110-4 may include a light for sending the amplified signal light. Additional details regarding components of compact optical amplifiers are described in the examples below.

As shown in FIG. 1B, in some implementations, the components of compact optical amplifier 150 may be assembled on a planar optical package. Notably, while implementations described herein are described in the context of optical packages, other implementations are possible, such as an implementation in which optics are assembled on an optical bench or carrier that is placed in an optical package.

In some implementations, the use of a planar optical package improves manufacturability of compact optical amplifier 150 (e.g., as compared to the prior art optical amplifiers described above). For example, since the components of compact optical amplifier 150 are coupled via free-space (rather than by spliced optical fibers) a need for fiber management and splicing may be eliminated. Thus, assembly of compact optical amplifier 150 may be amenable to an automation (e.g., an automated pick-and-place process) thereby reducing manufacturing cost.

Furthermore, the use of the planar optical package may allow for a size reduction in compact optical amplifier 150 (e.g., as compared to the prior art optical amplifiers described above). For example, in some implementations, compact optical amplifier 150 may have a reduced height (e.g., less than approximately 4 millimeters (mm)) as compared a cylindrical platform typically used by the prior art optical amplifiers.

Moreover, this size reduction can be achieved without sacrificing performance. For example, since the components of compact optical amplifier 150 are essentially discrete components, coupled via free-space, assembled on the planar optical package, each component maybe individually manipulated with respect to any degree of freedom in order to optimize optical alignment (i.e., no degrees of freedom are lost, as in the case of using hybrid components). As such, optical alignment of compact optical amplifier 150 may be readily achievable (e.g., as compared to the prior art optical amplifiers described above), which may reduce cost and/or improve performance of compact optical amplifier 150.

Additionally, the use of the planar optical package, and coupling of components via free-space, may provide an ability to integrate additional components into the optical package that is not present in the prior art optical amplifiers. For example, due to the use of the planar optical package (and the free-space coupling of the components assembled thereon), one or more components may be integrated in the optical package. Examples of such components include a tunable filter, a variable optical attenuator, an array of mirrors (e.g., a MEMS array), a dispersive component (e.g., a diffraction grating), one or more components for mitigating cross talk (e.g., a baffle, a spatial filter, etc.) and/or the like.

Further, the use of the planar optical package, and coupling of components via free-space, may provide an ability to manage thermal issues. For example, components of the compact optical amplifier may be arranged such that components with high thermal sensitivity are at a sufficient distance from a heat source, such as a source, so as not to impact performance.

The number and arrangement of components shown and described in association with FIG. 1B are provided as an example. In practice, compact optical amplifier 150 may include additional components, fewer components, different components, differently sized components, and/or differently arranged components than those shown in FIG. 1B. Further, compact optical amplifier 150 is provided as an overview of example features and capabilities of a compact optical amplifiers and, in some implementations, a compact optical amplifier may include one or more other features or capabilities, examples of which are described below.

Figure 2A:
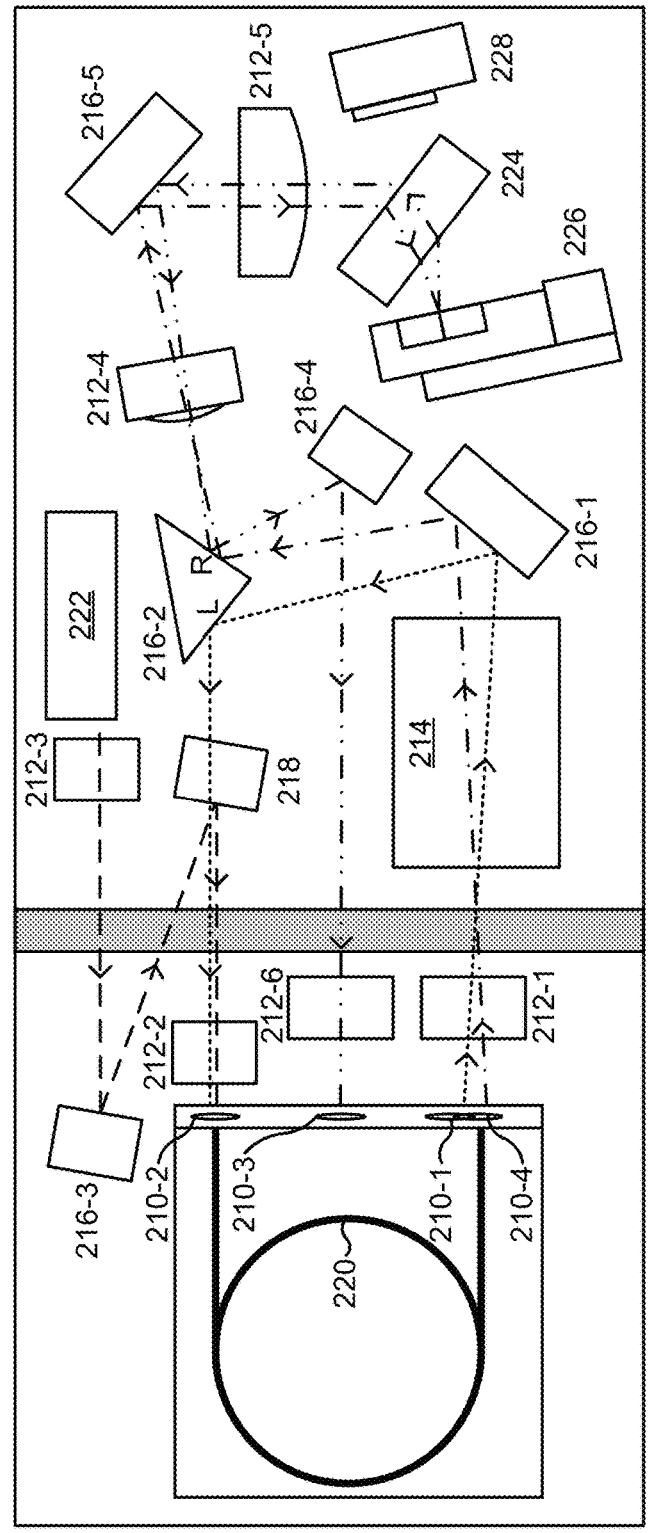
FIGS. 2A-2E are diagrams of an example implementation of a compact optical amplifier.

FIGS. 2A-2E are diagrams of an example implementation 200 of compact optical amplifier 150 (herein referred to as compact optical amplifier 200). As shown in FIG. 2A, compact optical amplifier 200 may include a set of ports 210 (e.g., port 210-1 through port 210-4), a set of lenses 212 (e.g., lens 212-1 through lens 212-6), an isolator 214, a set of mirrors 216 (e.g., mirror 216-1 through mirror 216-5), a combiner 218, an active gain medium 220, a source 222, a dispersive component 224, a reflective component 226, and a photo diode (PD) 228. Ports 210-1, 210-2, 210-3, and 210-4 may correspond to ports 110-1, 110-2, 11-3, and 110-4, respectively, of compact optical amplifier 150 shown in FIG. 1B. Similarly, combiner 218, active gain medium 220, and source 222 may correspond to combiner 118, active gain medium 120, and source 122 of compact optical amplifier 150 shown in FIG. 1B. One or more other components of compact optical amplifier 200 (e.g., isolator 214, mirror 216-1 through mirror 216-5, dispersive component 224, reflective component 226, PD 228, and/or the like) may correspond to free-space optics 115 of compact optical amplifier 150 in FIG. 1B.

As illustrated by FIG. 2A, and as described in further detail below, compact optical amplifier 200 may receive signal light 250, generate amplified light 254 from signal light 250 and pump light 252, and filter amplified light 254 such that a portion of amplified light 254 at or near a desired wavelength (herein referred to as amplified signal light 256) is output by compact optical amplifier 200. The components of compact optical amplifier 200 are described below, followed by an example operation of compact optical amplifier 200.

Port 210-1 includes a port to send (i.e., launch) light on an optical path of compact optical amplifier 200. For example, as shown in FIG. 2A and as described in further detail below, port 210-1 may launch signal light 250 on an optical path toward port 210-2. In some implementations, port 210-1 is coupled to an input fiber that provides signal light 250 for amplification by compact optical amplifier 200.

In some implementations, as in the case of compact optical amplifier 200, port 210-1 may include a port to launch signal light 250 at a particular angle from port 210-1 (e.g., an angle that differs from an angle at which port 210-4 launches amplified light 254). In some implementations, port 210-1 and port 210-4 may be spaced such that signal light 250 launched by port 210-1 at a first angle and amplified light 254 launched by port 210-4 at a second angle can be directed on different optical paths by mirror 216-1, while beneficially allowing the sharing of common components such as lens 212-1 and isolator 214, which facilitates cost and/or size reduction of compact optical amplifier 200 (e.g., since the same components can be used on different optical paths rather than including separate, duplicate components on different optical paths). Generally, one or more components of compact optical amplifier 200 may be arranged on multiple optical paths (e.g., such the one or more components are shared by beams propagating on the multiple optical paths). For example, in some implementations, a single isolator 214 may be shared by signal light 250 and amplified signal light 254, as shown in FIG. 2A. Although not illustrated by compact optical amplifier 200, other examples of components that may be shared in a compact optical amplifier include lenses 212, mirrors 216, a tap filter (e.g., tap filter 232 described below in association with compact optical amplifier 300), and/or the like.

In some implementations, using separate ports 210-1 to launch signal light 250 and amplified light 254 may reduce cross-talk between signal light 250 and amplified light 254 in compact optical amplifier 200.

Port 210-2 includes a port to receive signal light 250 and pump light 252 that is to be input to active gain medium 220 of compact optical amplifier 200. For example, as shown in FIG. 2A and as described in further detail below, port 210-2 may receive signal light 250 and pump light 252, both of which may be directed to port 210-2 by combiner 218. In some implementations, port 210-2 is coupled to an input of active gain medium 220 and, thus, operates as an input associated with active gain medium 220 (i.e., an active gain medium input).

Port 210-3 includes a port to receive amplified signal light 256 (i.e., a portion of amplified light 254 at or near a desired wavelength) on an optical path of compact optical amplifier 200. For example, as shown in FIG. 2A and as described in further detail below, port 210-3 may receive amplified signal light 256 on an optical path of compact optical amplifier 200. In some implementations, port 210-3 is coupled to an output fiber that outputs amplified signal light 256 generated by compact optical amplifier 200.

Port 210-4 includes a port to launch amplified light 254 on another optical path toward reflective component 226. In some implementations, port 210-4 is coupled to an output of active gain medium 220 and, thus, operates as an output associated with active gain medium 220 (i.e., an active gain medium output).

Lens 212-1 may include a lens (e.g., a circular lens) to collimate signal light 250 launched by port 210-1 on an optical path toward port 210-2 and to collimate amplified light 254 launched by port 210-4 on an optical path toward reflective component 226.

Lens 212-2 includes a lens (e.g., a circular lens) to focus signal light 250 and pump light 252 at port 210-2. Lens 212-3 includes a lens (e.g., a circular lens) to collimate pump light 252 launched by source 222 on an optical path toward port 210-2. In some implementations, lens 212-2 and lens 212-3 may collectively operate to resize (e.g., magnify) pump light 252. For example, a beam size of pump light 252 launched by source 222 may be different from (e.g., smaller than) a beam size of pump light 252 that is to be provided at port 210-2. In such a case, lens 212-2 and lens 212-3 may be arranged such that, after passing through lens 212-2 and lens 212-3, pump light 252 is resized to the (e.g., larger) beam size needed at port 210-2.

Figure 3A:
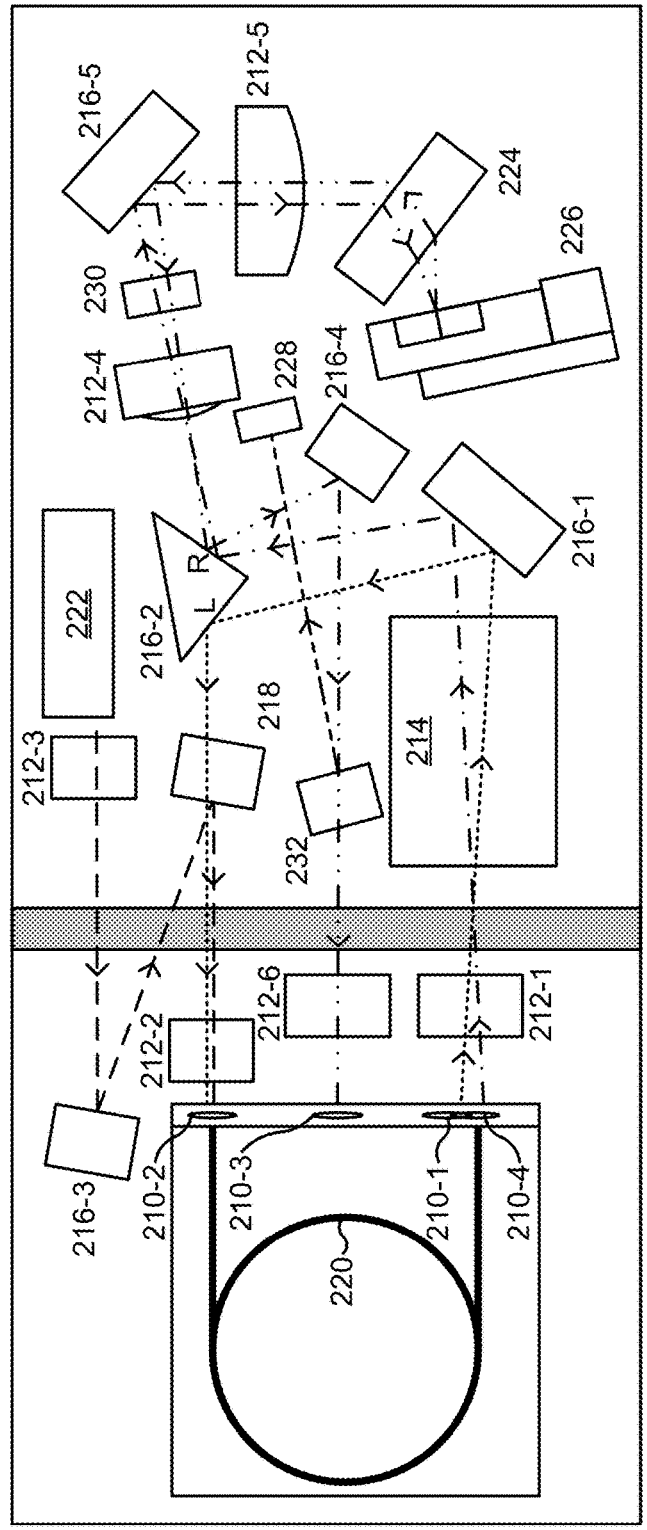
FIGS. 3A-3D are diagrams associated with another example implementation of a compact optical amplifier.

In some compact optical amplifiers (e.g., compact optical amplifier 200, compact optical amplifier 300 associated with FIG. 3A), lens 212-4 and lens 212-5 serve as beam shaping optics to resize amplified light 254 on an optical path toward reflective component 226 and to resize amplified signal light 256 on an optical path toward port 210-3. In some implementations, resizing (e.g., increase a beam size) of amplified light 254 may be needed in order to improve resolution associated with a tunable filter of compact optical amplifier 200 (e.g., a tunable filter collectively formed by dispersive component 224 and reflective component 226) and/or in order to satisfy a performance requirement of another component of compact optical amplifier 200 (e.g., dispersive component 224, reflective component 226, and/or the like). In such a case, lens 212-4 and lens 212-5 may be arranged such that, after passing through lens 212-4 and lens 212-5, amplified light 254 is resized to the (e.g., larger) beam size needed at dispersive component 224 and/or reflective component 226. Similarly, lens 212-4 and lens 212-5 may resize amplified signal light 256 (e.g., such that the beam size is returned to the previous size) for coupling to port 210-3. Lens 212-4 and lens 212-5 may collectively be referred to herein as beam shaping optics of compact optical amplifier 200. Further, in some implementations, the beam shaping optics may facilitate a size reduction of compact optical amplifier 200 by, for example, allowing a given component to be sized relative to a size of a beam incident at the given component (e.g., since comparatively smaller components may be used for beams of comparatively smaller size). Notably, in some implementations, the beam shaping optics may be formed from one or more other components (e.g., a different number of lenses, a different type of lens, a set of prisms, or the like) than those shown in compact optical amplifier 200.

In some implementations, lens 212-4 and/or lens 212-5 may be a circular lens (e.g., such that a beam passing through lens 212-4 and/or lens 212-5 maintains a circular shape). Alternatively lens 212-4 and/or lens 212-5 may be cylindrical lens that resizes amplified light 254 and amplified signal light 256 in only one direction (e.g., a direction parallel to a plane of the page of FIG. 2A). In some implementations, beam shaping optics may be formed using anamorphic prisms rather than lenses 212-4 and 212-5, examples of which are shown and described below with regard to FIGS. 4A and 4B.

In some implementations, lens 212-4 and lens 215, together with dispersive component 224 and/or reflective component 226, may be arranged such that an offset is created between an optical path of amplified light 254 and an optical path of amplified signal light 256. In other words, lens 212-4 and lens 215, together with dispersive component 224 and/or reflective component 226, may be arranged such that the optical path of amplified signal light 256 is different from the optical path of amplified light 254. In some implementations, this offset allows amplified light 254 and amplified signal light 256 to be differently directed by a same surface of mirror 216-2, as described below.

Lens 212-6 includes a lens (e.g., a circular lens) to focus amplified signal light 256 at port 210-3 for output by compact optical amplifier 200.

Isolator 214 includes a component that prevents (i.e., blocks) a beam of light from propagating in an unwanted direction along an optical path. For example, isolator 214 may be arranged to prevent or block reflected signal light 250 and/or reflected amplified light 254 (e.g., a portion of signal light 250 and/or a portion of amplified light 254 propagating from mirror 216-1 toward port 210-4) from being received at port 210-1 and/or port 210-4. As shown in FIG. 2A, isolator 214 may be arranged on a optical path between port 210-1 and mirror 216-1 and an optical path between port 210-4 and mirror 216-1, in some implementations.

Notably, while compact optical amplifier 200 includes a single isolator 214 (e.g., via which signal light 250 and amplified light 254 are propagated), in some implementations, compact optical amplifier 200 may include multiple isolators 214. For example, in order to reduce cross-talk between signal light 250 and amplified light 254, the optical paths of signal light 250 and amplified light 254 may be designed to be substantially non-parallel (e.g., by launching signal light 250 and amplified light 254 at substantially different angles, and/or the like). In some implementations, compact optical amplifier 200 may include a pair of isolators 214 (e.g., an isolator via which signal light 250 propagates, and an isolator 214 via which amplified light 254 propagates).

Mirrors 216 include mirrors to create folded optical paths of beams propagating through compact optical amplifier 200. In particular, mirror 216-1 and mirror 216-2 (e.g., a left surface of a prism mirror 216-2 as shown in FIG. 2A labeled with an "L") may be arranged to create a folded optical path of signal light 250. Mirror 216-3 may be arranged to create a folded optical path of pump light 252. Mirror 216-1, mirror 216-2 (e.g., a right surface of the prism mirror 216-2 as shown in FIG. 2A labeled with an "R"), and mirror 216-5 may be arranged to create a folded optical path of amplified light 254. Mirror 216-5, mirror 216-2 (e.g., the right surface of the prism mirror 216-2 as shown in FIG. 2A), and mirror 216-4 may be arranged to create a folded optical path of amplified signal light 256.

In some implementations, the folded optical paths created by mirrors 216 of compact optical amplifier 200 allow a size (e.g., a length and/or a width) of compact optical amplifier 200 to be reduced (e.g., as compared to an optical amplifier that does not implement optical path folding, such as the prior art optical amplifiers described above, which typically use a linear arrangement). In some implementations, one or more mirrors 216 of compact optical amplifier 200 may be planar mirrors, as shown in FIG. 2A. Additionally, or alternatively, one or more mirrors 216 of compact optical amplifier 200 may be curved mirrors that provide beam shaping functionality in addition to creating folded optical paths. In some implementations, one or more mirrors 216 of compact optical amplifier 200 may be fixed mirrors or actuated mirrors (e.g., micro-electro-mechanical systems (MEMS) mirrors).

Combiner 218 includes a component to combine beams of light by, for example, transmitting (i.e., passing) a first beam of light (e.g., signal light 250) and reflecting a second beam of light (e.g., pump light 252) based on wavelengths of the beams of light, based on directions of the beams of light, based on sources of the beams of light, or the like. For example, combiner 218 may include a wavelength division multiplexing (WDM) filter, a low-pass filter, a beam combiner, or the like. In some implementations, combiner 218 may reflect light of a wavelength of approximately 980 nanometers (nm) (e.g., pump light 252), and may transmit light of a wavelength of approximately 1550 nm (e.g., signal light 250). However, other examples are possible, and combiner 218 may transmit or reflect light of one or more other wavelengths. As shown in FIG. 2A, in some implementations, combiner 218 may be arranged to receive signal light 250, and send (transmit) signal light 250 to port 210-2 (e.g., via lens 212-2). As further shown, combiner 218 may be arranged to receive pump light 252, and send (reflect) pump light 252 to port 210-2.

Active gain medium 220 includes a gain medium (e.g., a fiber doped with rare earth ions, such as erbium, neodymium, ytterbium, praseodymium, thulium, and/or the like) to amplify signal light 250 using pump light 252. For example, in a case where active gain medium 220 is an erbium doped fiber, pump light 252 with a wavelength of approximately 980 nm excites erbium ions of active gain medium 220 that can amplify signal light 250 with a wavelength of approximately 1550 nm via stimulated emission. In some implementations, as shown in FIG. 2A, active gain medium 220 may be coupled to port 210-2 such that an input of active gain medium 220 receives signal light 250 and pump light 252 from combiner 218 (e.g., via lens 212-2). As further shown, active gain medium 220 may be coupled to port 210-4 such that an output of active gain medium 220 (i.e., amplified light 254) is launched by port 210-4. In some implementations, as shown in FIG. 2A, active gain medium 220 may be arranged on the planar optical package of compact optical amplifier 200. Alternatively, active gain medium 220 may be external to the planar optical package of compact optical amplifier 200, in some implementations. In some implementations, active gain medium 220 may be a doped fiber (as described above), a doped glass rod, a doped planar waveguide, and/or the like (e.g., rather than a doped optical fiber).

Source 222 is a laser diode to send pump light 252 on an optical path toward port 210-2. For example, in some implementations, source 222 may be a distributed feedback (DFB) laser diode including a built-in distributed Bragg reflector (DBR) to control the laser wavelength, a Fabry-Perot (FP) laser diode, a diode laser with a fiber Bragg grating to control the laser wavelength, a diode laser with a reflective narrowband device (e.g., a DBR, a Bragg grating, a narrowband reflector, and/or the like) to control the laser wavelength, and/or the like.

Dispersive component 224 includes a component to separate amplified light 254 into dispersed wavelength sub-beams based on wavelength. For example, dispersive component 224 may include a diffraction grating, a prism, an Echelle grating, a grism, and/or the like. In some implementations, as shown in FIG. 2A, dispersive component 224 may be arranged on an optical path of amplified light 254 between lens 212-5 and reflective component 226. In some implementations, dispersive component 224 and reflective component 226 may collectively form a tunable filter associated with sending amplified signal light 256 on an optical path toward port 210-3, as described below.

Reflective component 226 includes a component to receive amplified light 254 and send (reflect) a portion of amplified light 254 (i.e., a portion of amplified signal 254 at or near a desired wavelength, also referred to as amplified signal light 256) on an optical path toward port 210-3 (e.g., for output by compact optical amplifier 200). For example, reflective component 226 may include a micro-electro-mechanical systems (MEMS) mirror, a liquid crystal on silicon (LCoS) mirror, and/or the like. In some implementations, reflective component 226 may include a grating on a surface of reflective component 226 in order to provide the above described dispersive functionality. In such a case, compact optical amplifier 200 may not include dispersive component 224.

In some implementations, dispersive component 224 and reflective component 226 may collectively form a tunable filter. For example, dispersive component 224 may separate (e.g., in a direction parallel to the plane of FIG. 2A) amplified light 254 into dispersed wavelength sub-beams such that each wavelength sub-beam exits dispersive component 224 at a different angle. Thus, the dispersed wavelength sub-beams of amplified light 254 are incident on different locations on the surface of reflective component 226. Here, reflective component 226 may be adjusted at a particular angle such that a particular wavelength channel sub-beam (e.g., a portion of amplified light 254 at or near the desired wavelength, amplified light 254 referred to as amplified signal light 256) is sent on an optical path for coupling at port 210-3. In compact optical amplifier 200, other wavelength sub-beams of amplified light 254 are misaligned such that these other wavelength sub-beams do not couple with port 210-3. In some implementations, the tunable filter formed by dispersive component 224 and reflective component 226 may be tuned (e.g., by adjusting an amount of voltage supplied to reflective component 226) to a desired wavelength by adjusting an angle of reflective component 226 such that a portion of amplified signal 254 at or near the desired wavelength is sent on the optical path toward port 210-3.

In some implementations, the tunable filter of compact optical amplifier 200 may include dispersive component 224, as described above. Additionally, or alternatively, the tunable filter may include one or more other components, such as a thin film filter, an etalon, and/or the like. Generally, the tunable filter of compact optical amplifier 200 includes one or more components that receive amplified light 254 on an optical path of compact optical amplifier 200, and send amplified signal light 256 (i.e., a portion of amplified signal 254 at or near a desired wavelength) on another optical path of compact optical amplifier 200 for coupling with port 210-3. In some implementations, when compact optical amplifier 200 does not include dispersive component 224, a partial power reflection filter may be arranged (e.g., similar to the arrangement of dispersive component 224) in order to tap transmission power or reflective power to PD 228.

PD 228 includes an optional photo diode (or a photo diode array) to monitor an output power of amplified signal light 256. In some implementations, PD 228 may receive zero-order transmission power of amplified signal light 256, where the zero-order transmission power of amplified signal light 256 is directed to PD 228 by dispersive component 224 as amplified signal light 256 propagates along the optical path toward port 210-3.

In some implementations, as shown in FIG. 2A, the components of compact optical amplifier 200 are arranged in a planar optical package. In some implementations, the planar optical package may have a height that is less than approximately 4 mm, such as 3.5 mm. In some implementations, the planar optical package may have a width that is less than approximately 12 mm, such as 8 mm. In some implementations, the planar optical package may have a length that is less than approximately 22 mm, such as 18 mm. In some implementations, the planar optical package of a compact optical amplifier 200 may have a size that is less than approximately one cubic centimeter.

In some implementations, one or more components of compact optical amplifier 200 may be arranged in a hermetically sealed portion of the planar optical package. For example, components on a right side of an optical window of compact optical amplifier 200 (e.g., indicated by a shaded rectangle in FIG. 2A), such as source 222, reflective component 226, and the beam shaping optics of compact optical amplifier 200 (e.g., lens 212-4 and lens 212-5) may be arranged within a hermetically sealed portion of the planar optical package. Notably, in some implementations, one or more components (e.g., mirror 216-3) may be arranged outside of the hermetically sealed portion, thereby enabling alignment adjustments after the hermetically sealed portion is sealed.

Figure 2B:
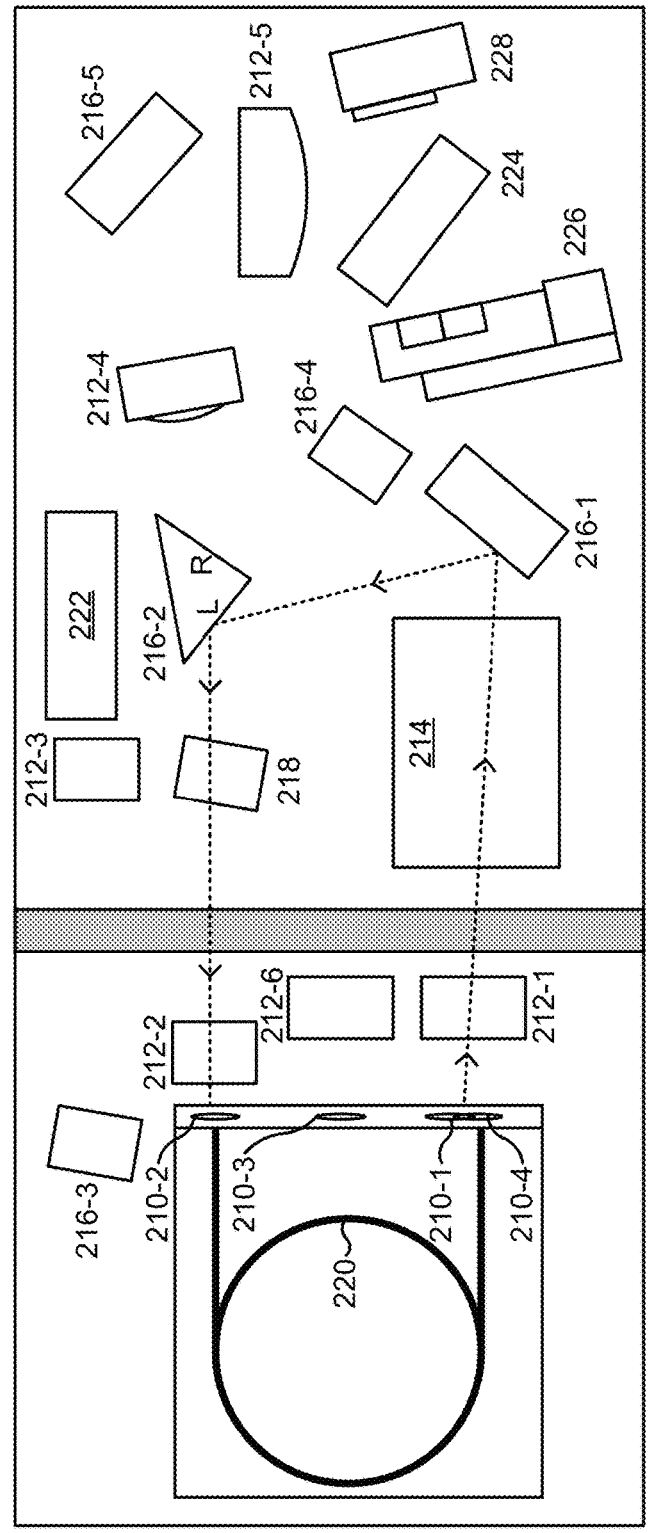

In an example operation of compact optical amplifier 200, and with reference to FIG. 2B, port 210-1 (e.g., coupled to an input fiber) launches signal light 250 on an optical path from port 210-1 toward port 210-2 (sometimes referred to as a first optical path). As shown in FIG. 2B, signal light 250 propagates through isolator 214 and is directed by mirror 216-1 and a left surface of mirror 216-2 to combiner 218. Combiner 218 sends (transmits) signal light 250 to port 210-2 (i.e., an input of active gain medium 220) via lens 212-2.

Figure 2C:
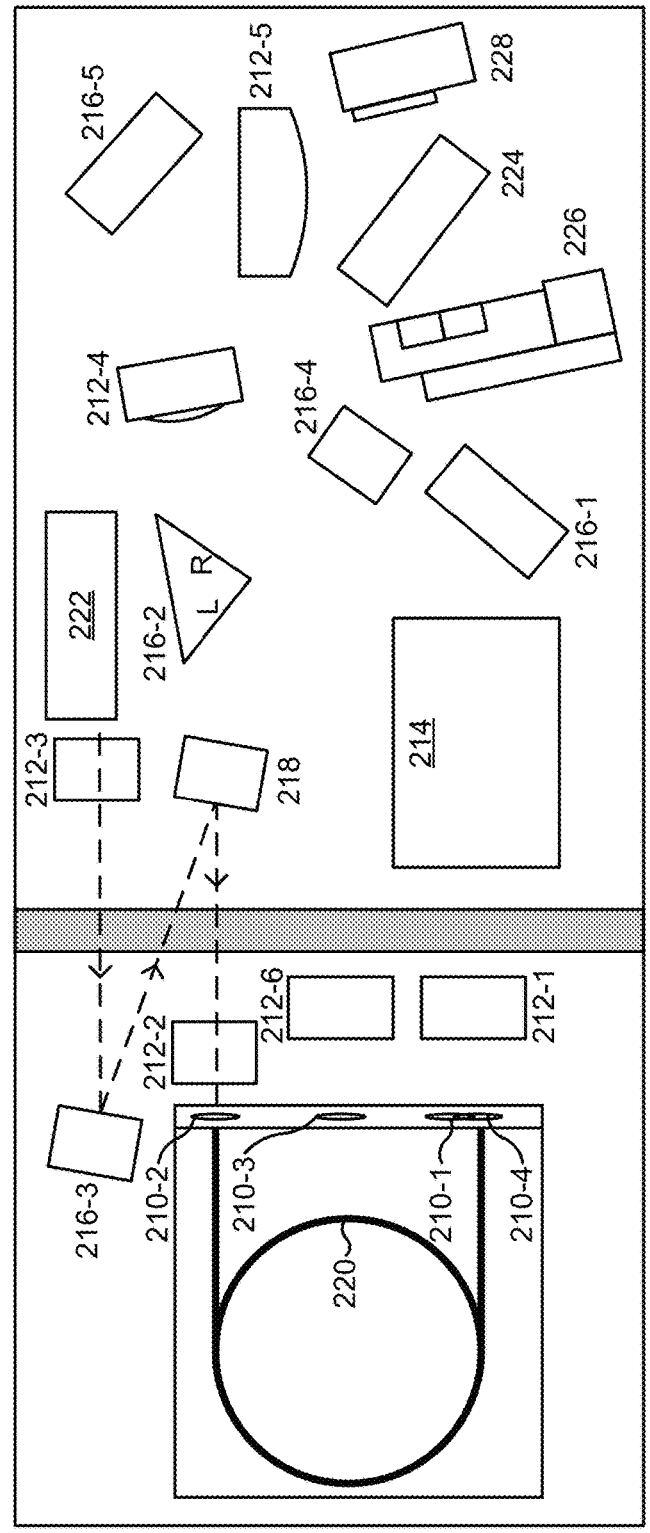

With reference to FIG. 2C, source 222 launches pump light 252 on an optical path from source 222 toward port 210-2 (sometimes referred to as a second optical path). As shown in FIG. 2C, pump light 252 is directed by mirror 216-3 to combiner 218. Combiner 218 sends (reflects) pump light 252 to port 210-2 via lens 212-2. In some implementations, as described above, lens 212-3 and lens 212-2 operate to resize pump light 252. Active gain medium 220 generates amplified light 254 from signal light 250 and pump light 252.

Figure 2D:
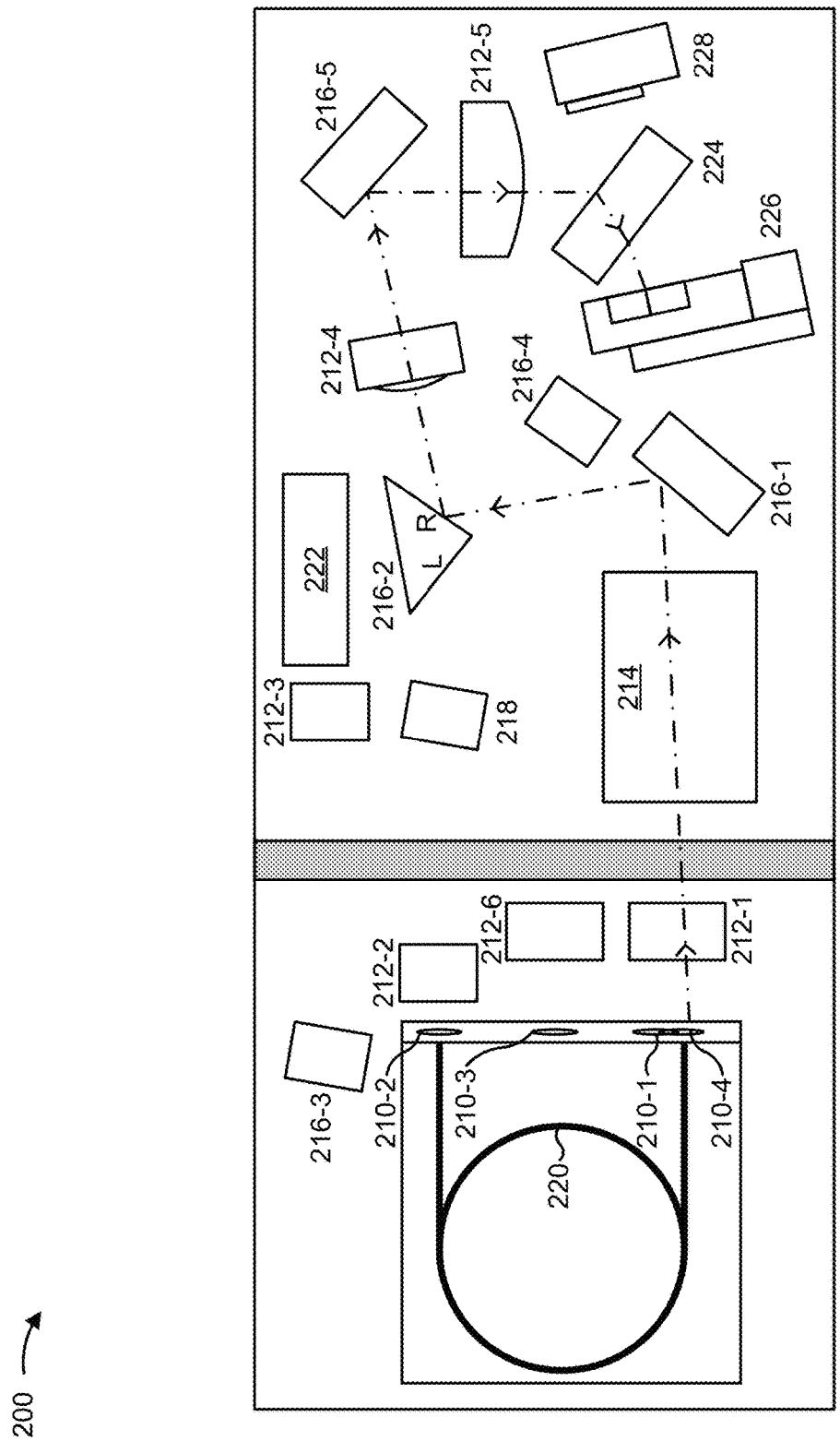
Figure 2E:
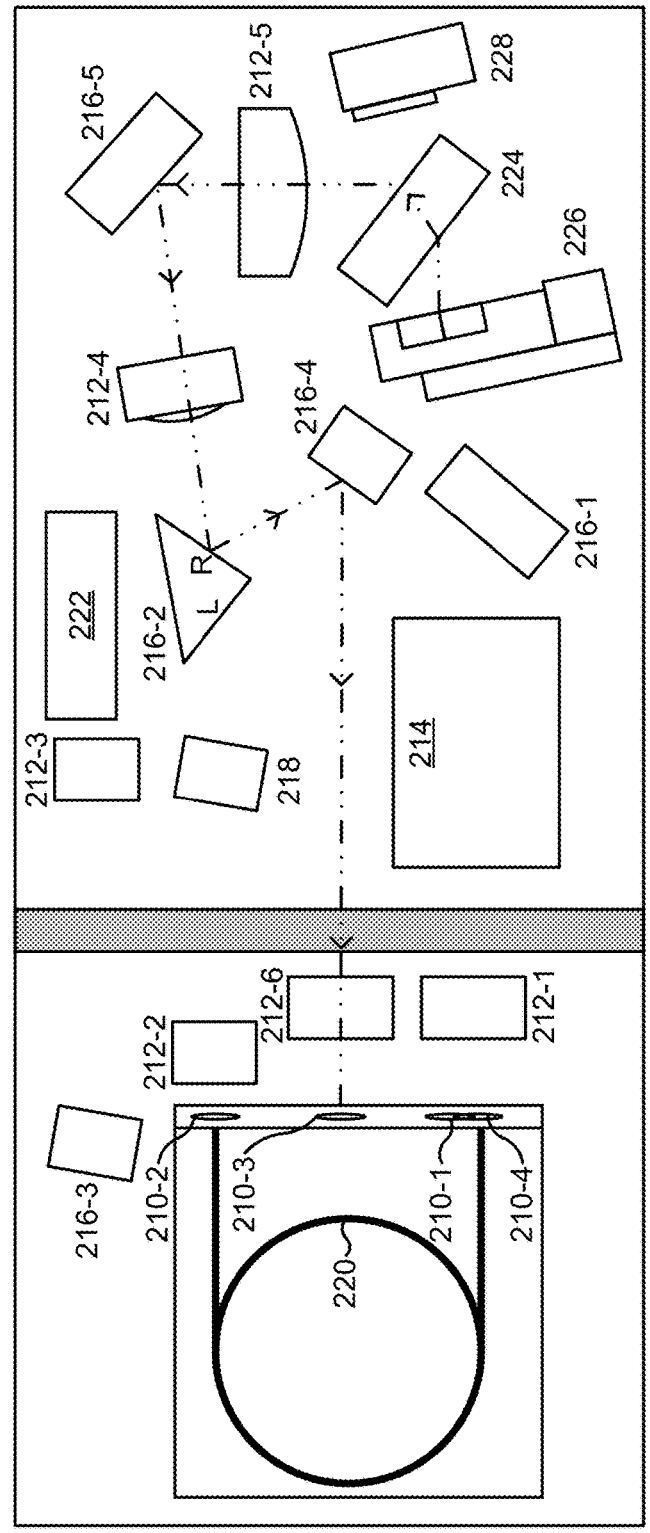

With reference to FIG. 2D, port 210-4 (e.g., coupled to an output of active gain medium 220) launches amplified light 254 on an optical path from port 210-4 toward reflective component 226 (sometimes referred to as a third optical path). As shown in FIG. 2D, amplified light 254 propagates through isolator 214 and is directed by mirror 216-1 and a right surface of mirror 216-2 to the beam shaping optics of compact optical amplifier 200 (e.g., lens 212-4 and lens 212-5). As described above, the beam shaping optics of compact optical amplifier 200 resizes (e.g., increase a beam size of) amplified light 254 (e.g., in order to improve resolution associated with the tunable filter formed by dispersive component 224 and/or reflective component 226, in order to satisfy a requirement of dispersive component 224 and/or reflective component 226, and/or the like). As further shown, amplified light 254 is directed by mirror 216-5 toward the tunable filter of compact optical amplifier 200 (e.g., dispersive component 224 and reflective component 226).

As described above, and with reference to FIG. 2E, the tunable filter of compact optical amplifier 200 (e.g., including dispersive component 224 and reflective component 226) directs amplified signal light 256 (i.e., a portion of amplified light 254 at or near a desired wavelength) on an optical path from reflective component 226 toward port 210-3 (sometimes referred to as a fourth optical path). As described above, zero order transmission power of amplified signal light 256 may be transmitted to PD 228. The beam shaping optics of compact optical amplifier 200 resize (e.g., decrease a size of) amplified signal light 256 (e.g., in order to resize amplified signal light 256 to the previous beam size). As further shown in FIG. 2E, mirror 216-5, the right surface of mirror 216-2, and mirror 216-4 direct amplified signal light 256 to port 210-3, via lens 212-6, for output by compact optical amplifier 200.

The number and arrangement of components shown and described in association with FIGS. 2A-2E are provided as examples. In practice, compact optical amplifier 200 may include additional components, fewer components, different components, differently sized components, and/or differently arranged components than those shown in FIGS. 2A-2E.

FIGS. 3A-3D are diagrams associated with another example compact optical amplifier 300. As shown in FIG. 3A, compact optical amplifier 300 may include a set of ports 210 (e.g., port 210-1 through port 210-4), a set of lenses 212 (e.g., lens 212-1 through lens 212-6), an isolator 214, a set of mirrors 216 (e.g., mirror 216-1 through mirror 216-5), a combiner 218, an active gain medium 220, a source 222, a dispersive component 224, a reflective component 226, a PD 228, a spatial filter 230, and a tap filter 232. One or more other components of compact optical amplifier 300 (e.g., isolator 214, mirror 216-1 through mirror 216-5, dispersive component 224, reflective component 226, PD 228, spatial filter 230, tap filter 232, and/or the like) may correspond to free-space optics 115 of compact optical amplifier 150 in FIG. 1B.

Ports 210, lenses 212, isolator 214, mirrors 216, combiner 218, active gain medium 220, source 222, dispersive component 224, and reflective component 226 may be operate and be arranged in a manner similar to that described in association with FIGS. 2A-2E.

In compact optical amplifier 300, PD 228 may be operate as described above. However, as shown in FIG. 3A, PD 228 may be arranged such that PD 228 receives a portion of amplified signal light 256 sent (reflected) to PD 228 by tap filter 232 after amplified signal light 256 passes through spatial filter 230 (e.g., rather than PD 228 receiving amplified signal light 256 from a zero-order transmission at dispersive component 224, as in the case of compact optical amplifier 200).

Spatial filter 230 includes a component to filter (e.g., block, redirect, and/or the like) one or more portions of amplified light 254 at undesired wavelengths (e.g., portions that are not at or near the desired wavelength, such as leftover pump light 252, noise generated with compact optical amplifier 300, and/or the like). In some implementations, spatial filter 230 may include a set of apertures (e.g., etched metal apertures) through which amplified light 254 and amplified signal light 256 are directed. Additional details regarding spatial filter 230 are described below with regard to FIGS. 3B and 3C.

Tap filter 232 includes a component to direct a portion of amplified signal light 256 to PD 228 while allowing a remaining portion of amplified signal light 256 to continue on an optical path toward port 210-3. In some implementations, tap filter 232 may reflect a small portion (e.g., less than or equal to approximately 3% power) of amplified signal light 256 to PD 228, while allowing the remaining portion of amplified signal light 256 (e.g., greater than approximately 97% power) to continue on an optical path toward port 210-3.

Figure 3C:
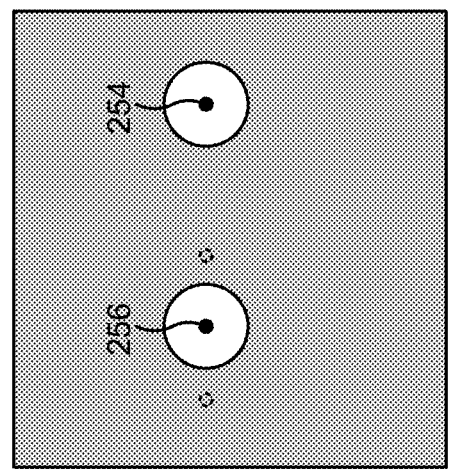
Figure 3B:
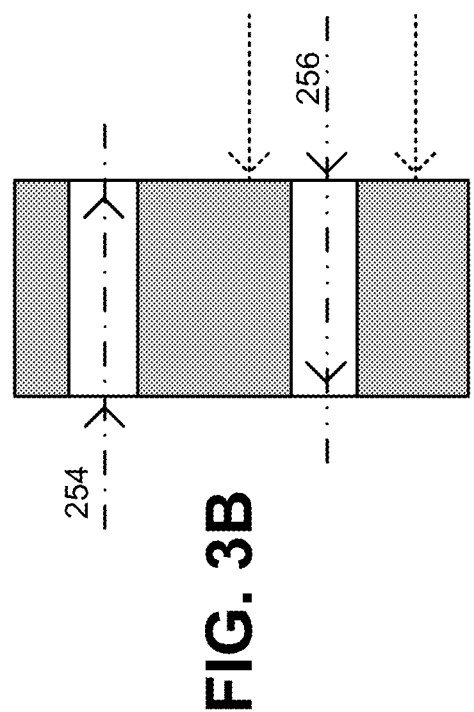

FIGS. 3B and 3C are diagrams of a top-view of filter 230 and a cross-sectional view of spatial filter 230, respectively. As shown in FIGS. 3B and 3C, amplified light 254, propagating on the optical path to reflective component 226, may pass through spatial filter 230 via a first aperture. As further shown, amplified signal light 256, propagating on the optical path to port 210-3, may pass through spatial filter 230 via a second aperture. As shown in FIGS. 3B and 3C by the dotted arrows and dotted circles, respectively, other portions of amplified light 254 (e.g., portions at undesired wavelengths, portions of amplified light 254 that are not sent on the optical path to port 210-3 by reflective component 226) may be incident on a section of spatial filter that blocks or redirects these portions (e.g., such that these portions are absorbed or no longer propagate on optical paths near the optical path to port 210-3).

In some implementations, such spatial filtering may improve a frequency response of PD 228. For example, with reference to the left diagram of FIG. 3D, without the spatial filtering provided by spatial filter 230, PD 228 will be responsive to a wider wavelength range than the wavelength range which exits port 210-3. With reference to the right diagram of FIG. 3D, with the spatial filter 230 in place, PD 228 may be responsive to a similar range of wavelengths as the port 210-3 and, thus, PD 228 may provide a more accurate indication of the output signal power.

In an example operation of compact optical amplifier 300, and with reference to FIG. 3A, port 210-1 (e.g., coupled to an input fiber) launches signal light 250 on an optical path from port 210-1 toward port 210-2 (sometimes referred to as a first optical path). Signal light 250 propagates through isolator 214 and is directed by mirror 216-1 and a left surface of mirror 216-2 to combiner 218. Combiner 218 sends (transmits) signal light 250 to port 210-2 (i.e., an input of active gain medium 220) via lens 212-2.

As further shown, source 222 launches pump light 252 on an optical path from source 222 toward port 210-2 (sometimes referred to as a second optical path). Pump light 252 is directed by mirror 216-3 to combiner 218. Combiner 218 sends (reflects) pump light 252 to port 210-2 via lens 212-2. In some implementations, as described above, lens 212-3 and lens 212-2 operate to resize pump light 252. Active gain medium 220 generates amplified light 254 from signal light 250 and pump light 252.

As further shown in FIG. 3A, port 210-4 (e.g., coupled to an output of active gain medium 220) launches amplified light 254 on an optical path from port 210-4 toward reflective component 226 (sometimes referred to as a third optical path). Amplified light 254 propagates through isolator 214 and is directed by mirror 216-1 and a right surface of mirror 216-2 to the beam shaping optics of compact optical amplifier 300 (e.g., lens 212-4 and lens 212-5). As described above, the beam shaping optics of compact optical amplifier 300 resizes (e.g., increase a beam size of) amplified light 254. In compact optical amplifier 300, amplified light 254 passes through a first aperture of spatial filter 230. As further shown, amplified light 254 is directed by mirror 216-5 toward the tunable filter of compact optical amplifier 300 (e.g., dispersive component 224 and reflective component 226).

The tunable filter of compact optical amplifier 300 directs amplified signal light 256 (i.e., a portion of amplified light 254 at or near a desired wavelength) on an optical path from reflective component 226 toward port 210-3 (sometimes referred to as a fourth optical path). The beam shaping optics of compact optical amplifier 300 resize amplified signal light 256 (e.g., in order to resize amplified signal light 256 to the previous beam size). Further, in compact optical amplifier 300, amplified signal light 256 passes through a second aperture of spatial filter 230 (e.g., while other portions of amplified light 254 are blocked or redirected by spatial filter 230) As further shown, mirror 216-5, the right surface of mirror 216-2, and mirror 216-4 direct amplified signal light 256 to tap filter 232. Tap filter 232 directs a portion of amplified signal light 256 to PD 228, and transmits the remaining portion of amplified signal light 256 to port 210-3, via lens 212-6, for output by compact optical amplifier 300.

Figure 3D:
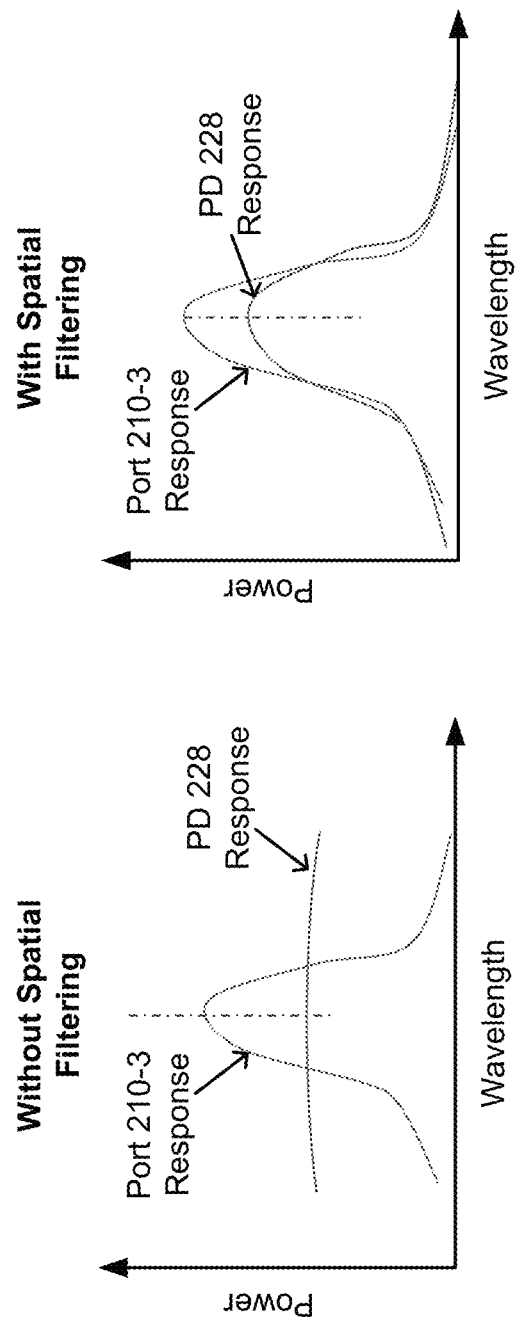

The number and arrangement of components shown and described in association with FIGS. 3A-3C are provided as examples. In practice, compact optical amplifier 300 may include additional components, fewer components, different components, differently sized components, and/or differently arranged components than those shown in FIGS. 3A-3C. Further, FIG. 3D is provided merely as an example for illustrative purposes, and other examples are possible.

Figure 4A:
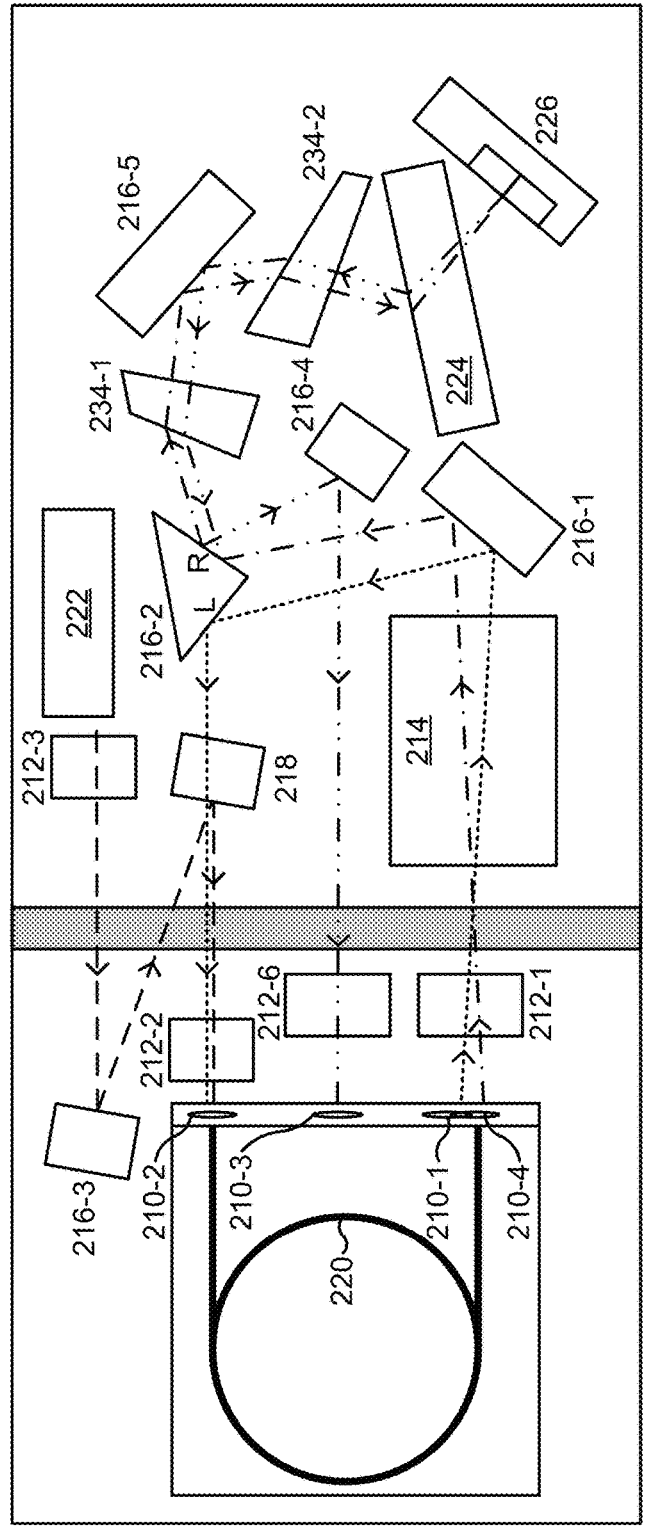
FIGS. 4A and 4B are diagrams of additional example implementations of compact optical amplifiers.
Figure 4B:
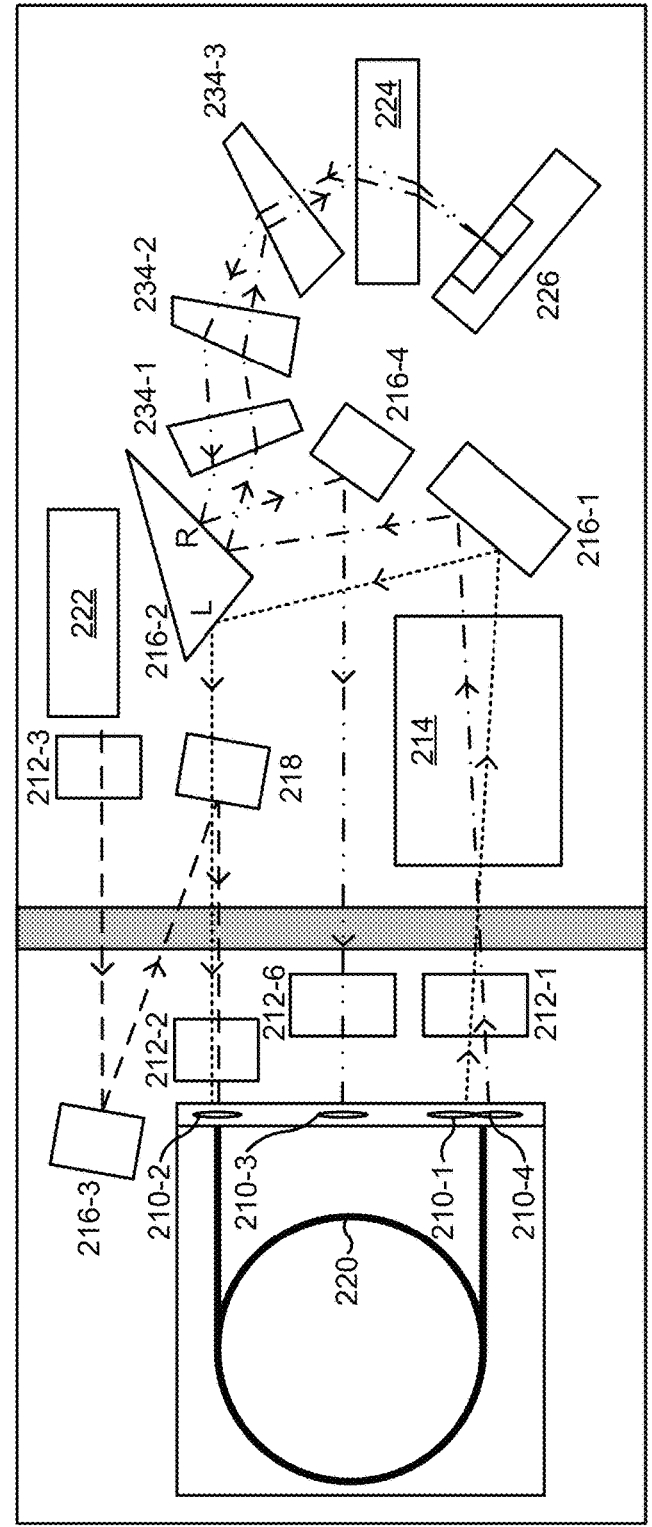

FIGS. 4A and 4B are diagrams of additional example compact optical amplifiers 400 and 450, respectively. As shown in FIGS. 4A and 4B, compact optical amplifier 400 and 450, respectively, may include a set of ports 210 (e.g., port 210-1 through port 210-4), a set of lenses 212 (e.g., lens 212-1 through lens 212-3, and lens 212-6), an isolator 214, a set of mirrors 216 (e.g., mirror 216-1 through mirror 216-5), a combiner 218, an active gain medium 220, a source 222, a dispersive component 224, a reflective component 226, and a set of anamorphic prisms 234 (e.g., anamorphic prisms 234-1 and 234-2 are included in compact optical amplifier 400, and anamorphic prisms 234-1 through 234-3 are included in compact optical amplifier 450). One or more components of compact optical amplifiers 400 and 450 (e.g., isolator 214, mirror 216-1 through mirror 216-5, dispersive component 224, reflective component 226, anamorphic prisms 234-1 through 234-3, and/or the like) may correspond to free-space optics 115 of compact optical amplifier 150 in FIG. 1B.

Ports 210, lenses 212, isolator 214, mirrors 216, combiner 218, active gain medium 220, source 222, dispersive component 224, and reflective component 226 may operate and be arranged in a manner similar to that described in association with FIGS. 2A-2E. Notably, although not shown in FIGS. 4A and 4B, compact optical amplifier 400 and/or compact optical amplifier 450 may include PD 228, spatial filter 230, and/or tap filter 232, which may operate and/or be arranged in a manner similar to that described above.

Anamorphic prisms 234 are prisms to resize amplified light 254 on an optical path toward reflective component 226 and to resize amplified signal light 256 on an optical path toward port 210-3. However, in contrast to circular lenses (e.g., lens 212-4 and lens 212-5), anamorphic prisms 234 resize amplified light 254 and amplified signal light 256 in only one direction (e.g., a direction parallel to a plane of the page of FIGS. 4A and 4B). FIG. 4A shows an example compact optical amplifier 400 including two anamorphic prisms 234, while FIG. 4B shows example compact optical amplifier 450 including three anamorphic prisms 234 (without including mirror 216-5).

In some implementations, as described above, resizing of amplified light 254 may be needed in order to improve resolution associated with a tunable filter of compact optical amplifier 200 (e.g., a tunable filter collectively formed by dispersive component 224 and reflective component 226) and/or in order to satisfy a performance requirement of another component of compact optical amplifier 400, such as dispersive component 224 and/or reflective component 226. In such a case, anamorphic prisms 234 may be arranged to perform such resizing. In other words, a set of anamorphic prisms 234 may form the beam shaping optics of compact optical amplifier 400 or compact optical amplifier 450 (e.g., rather than lens 212-4 and lens 212-5, as in the case of compact optical amplifier 200 and compact optical amplifier 300).

In some implementations, compact optical amplifiers 400 and 450 may operate to amplify signal light 250 in a manner similar to that described above.

The number and arrangement of devices shown and described in association with FIGS. 4A and 4B are provided as examples. In practice, compact optical amplifier 400 and/or compact optical amplifier 450 may include additional components, fewer components, different components, differently sized components, and/or differently arranged components than those shown in FIGS. 4A and 4B.

Some implementations described herein provide a compact optical amplifier that uses components assembled on a planar optical package such as an optical bench. The compact optical amplifier has a reduced size in terms of thickness, length, and/or width (e.g., as compared to the prior art optical amplifiers described above). Additionally, the compact optical amplifier reduces loss by requiring fewer instances of free space optics-to-fiber coupling and/or fiber-to-free space optics coupling for light propagating through the optical amplifier system (e.g., as compared to the prior art optical amplifiers described above).

The foregoing disclosure provides illustration and description, but is not intended to be exhaustive or to limit the implementations to the precise form disclosed. Modifications and variations are possible in light of the above disclosure or may be acquired from practice of the implementations.

For example, while compact optical amplifiers, described herein, are single stage optical amplifiers, in some implementations, multiple compact optical amplifiers may be coupled to form a multi-stage optical amplifier. For example, a first compact optical amplifier may be stacked on a second compact optical amplifier in order to form a two-stage compact optical amplifier. In such a case, the first compact optical amplifier and the second compact optical amplifier 200 may share one or more components, such as mirrors 216 (e.g., by doubling a height of mirrors 216), may include stacked components (e.g., stacked lenses 212, stacked isolators 214, stacked sources 222, and/or the like), may include stacked ports 210, may include an array of reflective components 226 (e.g., a MEMS array), and/or the like.

As another example, components of a compact optical amplifier may be arranged to form a parallel optical amplifier that pumps two or more beams signal light 250 using pump light 252 provided by a single source 222. In such a case, the compact optical amplifier may include additional ports 210 and/or one or more other additional and/or different components or differently arranged components than illustrated in the above examples.

As another example, components of a compact optical amplifier may be arranged to provide pump switching functionality, whereby pump light 252, provided by source 222, is selectively directed in association with pumping one or more separate beams of signal light 250. In such a case, the compact optical amplifier may include additional ports 210 and/or one or more other additional and/or different components or differently arranged components than illustrated in the above examples.

As another example, components of a compact optical amplifier may be arranged to provide pump combining functionality, whereby two or more beams of pump light 252, provided by two or more respective sources 222, are used to pump signal light 250. In such a case, the compact optical amplifier may include additional sources 222 and/or one or more other additional and/or different components or differently arranged components than illustrated in the above examples.

As another example, components of a compact optical amplifier may be arranged to provide polarization multiplexed pump combining functionality, whereby beams of pump light 252, provided by respective sources 222, are used to pump beams of signal light 250 in different polarizations. In such a case, the compact optical amplifier may include additional sources 222, ports 210, and/or one or more other additional and/or different components or differently arranged components than illustrated in the above examples.

As another example, while compact optical amplifiers, described herein, use reflective component 226 in conjunction with dispersive component 224 to form a tunable filter, in some implementations, reflective component 226 may be used as a switching engine for a variable optical attenuator (VOA) (e.g., in a multi-stage optical amplifier), as an optical switch for a switchable gain optical amplifier, and/or the like.

As another example, in the case of a compact optical amplifier including a combiner 218 in the form of a WDM filter, the compact optical amplifier may include one or more other optical components in an optical path associated with combiner 218, such as gain flattening filter (GFF), a band pass filter (BPF), and/or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. An optical device, comprising:
 a package having:
  a first port for receiving signal light;
  a source for providing pump light;
  a combiner for combining the signal light and the pump light into combined light;
  a second port for sending the combined light;
  a third port for receiving amplified light;

a free-space optical system for filtering amplified signal light from the amplified light, and a fourth port for sending the amplified signal light after the filtering, wherein the free-space optical system includes beam shaping optics, that enlarge a beam size of the amplified light prior to the filtering, between the third port and the fourth port.

2. The optical device of claim 1, wherein the free-space optical system includes a component that is arranged on multiple optical paths such that the component is shared by respective beams of light propagating on the multiple optical paths.

3. The optical device of claim 2, wherein the component is an isolator for isolating the signal light and the amplified light, wherein the multiple optical paths include an optical path on which the signal light propagates and an optical path on which the amplified light propagates.

4. The optical device of claim 1, wherein the free-space optical system includes one or more components that are in a hermetically sealed portion of the package.

5. The optical device of claim 1, wherein the source and the combiner are in a hermetically sealed portion of the package.

6. The optical device of claim 1, wherein the package includes a planar optical package on which the first port, the second port, the third port, the fourth port, the source, the combiner, and the free-space optical system are arranged.

7. The optical device of claim 1, wherein at least one of the signal light, the pump light, the amplified light, or the amplified signal light propagates on a folded optical path within the optical device.

8. The optical device of claim 1, wherein the free-space optical system includes a tunable filter system for filtering the amplified signal light from the amplified light.

9. The optical device of claim 8, wherein the tunable filter system comprises a micro-electro-mechanical system (MEMS) mirror and a diffraction grating.

10. The optical device of claim 1, wherein the free-space optical system includes a spatial filter for further filtering the amplified signal light.

11. The optical device of claim 1, wherein the first port, the second port, the third port, the fourth port, the source, the combiner, or one or more components of the free-space optical system are arranged to manage thermal issues within the optical device.

12. The optical device of claim 1, wherein the package has a size that is less than approximately one cubic centimeter.

13. An optical package, comprising:
a plurality of ports including:
a first port for receiving signal light,
a second port for sending combined light,
a third port for receiving amplified light, and
a fourth port for sending amplified signal light;
a source for providing pump light;
a combiner for combining the signal light and the pump light into the combined light; and
free-space optics for filtering the amplified signal light from the amplified light before the amplified signal light is sent by the fourth port,
wherein the free-space optics include beam shaping optics, for resizing the amplified light prior to the filtering, between the third port and the fourth port.

14. The optical package of claim 13, wherein the free-space optics include a component that is arranged on multiple optical paths such that the component is shared by respective beams of light propagating on the multiple optical paths.

15. The optical package of claim 13, wherein the free-space optics include one or more components that are in a hermetically sealed portion of the package.

16. The optical package of claim 13, wherein the source and the combiner are in a hermetically sealed portion of the package.

17. The optical package of claim 13, wherein the optical package is a planar optical package on which the first port, the second port, the third port, the fourth port, the source, the combiner, or the free-space optics are arranged.

18. The optical package of claim 13, wherein the free-space optics include a tunable filter system for filtering the amplified signal light from the amplified light.

19. The optical package of claim 13, wherein the free-space optics include a spatial filter for further filtering the amplified signal light.

20. A method, comprising:
receiving signal light by a first port of an optical device;
providing pump light by a source of the optical device;
combining, by a combiner of the optical device, the signal light and the pump light into combined light;
sending the combined light by a second port of the optical device;
receiving amplified light by a third port of the optical device;
resizing, by beam shaping optics of the optical device, a beam size of the amplified light,
wherein the beam shaping optics are included in a free-space optical system of the optical device;
filtering, by the free-space optical system of the optical device and after the resizing, amplified signal light from the amplified light; and
sending the amplified signal light after the filtering by a fourth port of the optical device,
wherein the beam shaping optics, that resize the beam size of the amplified light prior to the filtering, are between the third port and the fourth port.

* * * * *